Patented Sept. 30, 1952

2,612,474

UNITED STATES PATENT OFFICE 2,612,474

RESIN BASE DISPERSION PRODUCTS AND SYNTHETIC GREASES

John D. Morgan, South Orange, and Russell E. Lowe, East Orange, N. J., assignors, by mesne assignments, to Cities Service Research and Development Company, New York, N. Y., a corporation of New Jersey No Drawing. Application May 4, 1948, Serial No. 25,096

15 Claims. (Cl. 252—49.8)

1

This application is a continuation-in-part of our application Serial No. 585,823, filed March 30, 1945, copending at the time of filing of this application, but since abandoned.

This invention relates to new compositions of matter which may be employed as substitutes for mineral oils and other liquid lubricants at one end of the scale, or for thickened lubricants in the nature of greases at the other end, and is more particularly concerned with the new compositions as such and the methods by which they may be prepared.

We have discovered that a series of new compositions of matter may be prepared by the thermal reaction of a thermosetting plastic such as partially polymerized phenol formaldehyde resin, and one or more oily-like synthetic liquids such as tri-o-cresyl phosphate, tri octyl phosphate, tri butyl phosphate, dibutyl phthalate, and others which will be considered hereinafter, and that by an adjustment of the proportions of resin employed between 2 and 20 per cent with a consequent variation of the liquid phase material between 98 and 80 per cent, the consistency of the finished product may be varied between that of a thin, highly fluid oil at one extreme, and a thick gel having the consistency of a hard, stiff cup grease at the other extreme. In the reaction it appears that the phenol formaldehyde reaches a stage of complete polymerization, and that the resulting product is a colloidal dispersion of fully polymerized resin in the liquid, rather than a true chemical composition of two materials. Some evidence of this is the fact that heating of the finished products has no substantial effect upon their consistencies, or other properties, except insofar as continued heating at very high temperatures appears to evaporate away the liquid phase material leaving a mass of fully polymerized resin. Contrariwise, however, it may be noted that the finished dispersion products are not compatible with the starting liquids, and this is particularly true of products containing sufficient resin to form true gel structures. Thus the consistency of the final product is largely determined in the course of its preparation, and, once established, cannot be changed by the addition of resin or the liquid phase ingredient. Thus, while we do not know the exact nature of the final products, we may, for the sake of simplicity, refer to them as colloidal dispersions or gels.

The inert character of a fully polymerized phenol formaldehyde resin and its resistance to chemical reaction is well known and fully understood, and this property of the plastic material is carried over into the dispersion products to a greater or lesser degree, depending upon the proportions of resin employed. It will also be noted that all of the liquid phase materials mentioned above have good lubricating properties, medium to low vapor pressures, are liquids at low to very low temperatures, and are free from great chemical activity, all of which properties are carried over into the final dispersion products. Thus the new compositions are not subject to oxidation or other chemical change which would vary their consistencies and other properties, and they appear to have little or no reaction upon copper, steel, aluminum and other common metals of construction. A further and highly desirable property of the new dispersion products is their resistance to dissolution in ordinary solvents, which depends in part upon the amount of resin present. Even the softest of the gels which we have prepared appears to be insoluble in boiling water, and substantially so in hot gasoline, kerosine, and similar solvents, while the gels containing greater percentage of resin and having consistencies approaching those of ordinary cup greases, are substantially insoluble in most of the common aromatic and aliphatic commercial solvents as well as water and the petroleum products mentioned above.

All of our new compositions have proved to be excellent lubricants, their properties in this respect being largely dependent upon the particular liquid phase material which is employed. The lighter bodied dispersions have proven to be fine substitutes for mineral oils, while the gels are well adapted to use as thickened lubricants in the nature of synthetic greases, at both high and low temperature. We have, for example, prepared a thickened lubricant of this kind having the consistency of a comparatively soft cup grease, which performed satisfactorily at so low a temperature as —70° F., and which did not become unduly fluid at temperatures of the order of 300–400° F., and other gels have been made which act as excellent grease-like lubricants under heavy continuous loads at temperature of above 400° F. Even at these and higher temperatures the gels remained remarkably permanent in character, showing no tendency towards separation in a manner comparable to the bleeding of a soap grease. Thus the gels have been subjected to temperatures of the order of 600° F. for short periods without loss of lubricating value other than that resulting from the evaporation of the liquid phase material, and without showing any tendency towards a breaking down of the gel structure in a manner comparable to the burning of a conventional soap grease when it is subjected to high temperatures.

The full nature of the invention and the manner in which it may be carried out will be more apparent from consideration of the following examples of specific products which we have prepared.

Example 1

One composition embodying the invention, having the nature of a gel, which has proven particularly useful as a grease substitute, has the following composition:

| | Per cent by weight |
|---|---|
| Phenol formaldehyde resin | 11 |
| Tri octyl phosphate | 89 |

In preparing this product we dissolved about 8 grams of an acetone solution containing 80 per cent by weight of a phenol formaldehyde resin which had not been carried beyond first stage polymerization, and which contained an excess of formaldehyde, in some 50 grams of tri octyl phosphate, and heated the resulting solution to an ultimate temperature of 450° F. This solution, which was a clear orange liquid at a temperature of about 100° F., remained so until a temperature of between 400° and 420° F. was reached. At some point in that range a slight hazing was noted which became increasingly evident as the temperature rose until the material (still in a liquid state) reached a condition of complete opacity. During the first part of the heating operation acetone was driven off, after which there was a heavy evolution of formaldehyde vapor that dropped markedly as the temperature of the liquid approached 450° F. At that latter temperature a sudden reaction occurred in which the entire body of material went over almost instantly from an opaque liquid to a thick, stiff gel.

In carrying out the foregoing reaction we have found that when the starting solution is brought quickly from ordinary temperatures to gelation, it is essential to maintain constant and vigorous agitation in order to prevent burning of the resinous matter. Under such circumstances we prefer to stop heating, and particularly to stop agitation, as soon as gelation occurs for we have found that continued agitation tends to reduce the toughness of the final product. When the reaction is carried out at a slower rate, however, the liquid being brought from room temperature to gelation by a constant and comparatively slow rising temperature, agitation may be done away with entirely, and we find that the finished product is fully as good as that produced by quick reaction. It should also be noted that the temperatures which have been mentioned above, are not precisely determinate for we have found both the clouding point and the gelation point to vary in the preparation of gels of the same starting materials. In general, however, we have noted that clouding usually appears at some temperature between 410° and 430° F., and that gelation occurs at a temperature which is about 30° above the point of first clouding or hazing.

The character of the phenolic resin which is employed in making the foregoing product, and others which will later be described, appears to be highly critical to the formation of a satisfactory dispersion product. We have found, for example, that the starting material must not have been carried much beyond what is commonly called "first stage polymerization" and that it should contain an excess of formaldehyde as evidenced by the penetrating odor of that compound.

A suitable phenolic resin for gelation purpose may be prepared by the following method: U. S. P. phenol and a solution of 37.0 per cent by weight formaldehyde in the proportions of one mol of phenol to about one and one-half mols of formaldehyde are mixed in the presence of a small quantity of ammonia as a condensation catalyst. We have found that condensation catalysts other than ammonia, such as acid or sodium hydroxide yield resins which give muddy gels with the various plasticizers used. The mixture is then heated at reflux temperatures at atmospheric pressure for a period of about two hours in order to induce partial polymerization.

The partially polymerized resin is then dehydrated under reduced pressures, of the order of 25 mm. of mercury absolute, in a bath having a temperature of about 250° F., until the temperature of the resin rises to about 175 to 180° F. This will ordinarily take about 20 minutes. The dehydrated resin is then dissolved in acetone, and added to the plasticizer, such as tri octyl phosphate.

The example product at the completion of the gelation reaction was ruddy brown in color, was largely opaque, and had a rubber-like consistency, none of which properties changed to any substantial degree during cooling to room temperature. There is considerable evidence to support our belief that the foregoing thermal treatment results in a complete polymerization of the resin, and its colloidal dispersion throughout the liquid phase material. In those cases in which we intend to use the product as a high temperature thickened lubricant, however, or under other conditions where further chemical change might be undesirable, we prefer to cure the gel for a period of from one to four hours at a temperature of about 350° F. This after treatment seems to assure what we think is complete polymerization of all of the resin, or at least stabilizes the resin to such an extent that further polymerization will not take place in the dispersion product, as well as the elimination of all free formaldehyde and solvents, and it has the further effect of increasing the toughness of the product to some extent and of materially clarifying its color. In this connection we have found that long continued heating at temperatures ranging from 250-350° F. is particularly effective in producing a clear and transparent gel, rather than a muddy or opaque one.

The finished gel, and this appears to be true, regardless of whether it has been subjected to heat curing or not, is a stiff and tough gel having considerable elasticity, is of uniform consistency throughout, and is completely lacking the soft, plastic, inelastic properties which characterize a grease and make it easy to spread over bearing surfaces. These objections may readily be overcome by subjecting the gel to mechanical working in a colloid or orifice mill, or in any other suitable way, for a sufficient length of time to reduce it to a smooth, inelastic, and completely plastic product, having an A. S. T. M. penetration of about 300 in the general consistency of a soft cup grease.

The grease-like properties of the product have been tested in general accordance with procedures laid down in Army-Navy specification A. N. G. 3A. Thus it shows a separation of only 2.4 per cent, and an evaporation loss of about 0.91 per cent, after being held for a period of 50 hours at a temperature of 212° F. under the conditions prescribed in the foregoing specification. The spread and high temperature resisting characteristics of the product were tested by heating a small gob of it on a watch glass in an oven at a temperature of 350° F. for about 24 hours. At the end of that time the gob of synthetic grease had spread only slightly and was still a highly unctuous body having excellent lubricating properties. By way of contrast it may be noted that a similar test of a lithium base grease which meets the requirements of A. N. G. 3A, resulted in a spreading of the material over and under the watch glass, and in its substantial destruction as a lubricant.

The low temperature characteristics of the example gel have also proved to be excellent. In a torque test which was made in accordance with A. N. G. 3A we found that the time required to revolve a shaft lubricated with our synthetic grease under an applied torque of 2000 gram cm. at a temperature of −78° F. was somewhat less than one second. In this connection it may be noted that the precise time has not been given because the revolution of the shaft started and ended so quickly that we were unable to measure it with a standard stop watch. Various other tests to which the material has been put indicate that it is entirely suitable as a grease at temperatures ranging down to −70° F.

We have demonstrated by actual usage as well as by Hoffman bomb tests that the product is completely free from any tendency towards oxidation, and neither burns nor supports combustion, factors which make it particularly useful in high temperature lubrication work. In addition, the finished material seems to have substantially no tendency to chemical reaction. Thus it does not attack copper, steel, aluminum, or the alloys of these metals, nor does it give any evidence of internal chemical change when subjected to very high temperatures of the order of 600 to 800° F. even when subjected to high pressure.

A further property which is of particular utility in a lubricant is the comparative insolubility of our gel in a wide variety of commercial solvents. We have found, for example, that the foregoing gel is completely insoluble in boiling water, in gasoline, ethyl alcohol and many other solvents and is only mildly soluble in toluene.

We have noted hereinbefore that the consistency of the gel remains remarkably constant over a wide range of temperature variation. In this connection it should be noted that the consistency, once established by the formation of the gel, cannot be reduced by the addition of more tri octyl phosphate, or increased by the mixing in of additional resin solution, for it is not compatible with these compounds. The addition of either of these starting ingredients to the finished product merely results in a two-phase material of which one is the gel and the other the added agent.

By way of practical test we have found the example gel to be an excellent greaselike lubricant for the ball bearings of an electric motor under service conditions which called for quick starting at very low temperatures, and an ability to stand up under heavy loads for fairly long periods at maximum temperatures of the order of 350° F. It may be noted, by way of contrast, that a highly specialized lithium grease meeting all of the requirements of A. N. G. 3A proved to be incapable of performing under these rigorous service conditions, and was quickly destroyed by the high temperatures generated in the motor windings and bearings. The synthetic product has also proven well suited as a thickened lubricant for the bearings of high speed gyro instruments, as well as in more prosaic types of service.

*Example 2*

A very thin and light bodied dispersion product embodying the invention has the following formula:

| | Per cent by weight |
|---|---|
| Phenol formaldehyde resin | 2.7 |
| Tri octyl phosphate | 97.3 |

In preparing this product we employed a resin solution containing 70 per cent by weight of phenol formaldehyde resin dissolved in straight acetone. Two grams of this resin solution were dissolved in about 50 grams of tri octyl phosphate, and the mixture heated to an ultimate temperature of 460° F. The starting product, which was of a deep lemon color, gave no evidence of hazing during the entire heating operation, nor was there any final gelation reaction. There was, however, a very gradual deepening of color between about 400° and 460° F. to a clear Burgundy red. This liquid was cooled to room temperature without showing any evidence of change of character, and was subsequently heated for some 70 hours at a temperature of about 250° F., again without any apparent change in its properties. The final product, a thin, oily-like liquid having a viscosity somewhat greater than that of tri octyl phosphate alone, and of course, somewhat less than that of the resin material, has proven to be an excellent substitute for thin-bodied mineral oils and is particularly useful in the low temperature ranges where mineral oils tend to thicken appreciably.

*Example 3*

A third example composition embodying the invention has the following formula:

| | Per cent by weight |
|---|---|
| Phenol formaldehyde resin | 5.3 |
| Tri octyl phosphate | 94.7 |

The starting solution of this dispersion consisted of four grams of the 70 per cent resin solution referred to in Example 2, dissolved in about 50 grams of tri octyl phosphate. Upon the heating of this solution, the liquid remained clear until a temperature of about 430° F. was reached, at which point some traces of haze were noted. Continued heating produced further clouding until the liquid became slightly opaque at a temperature of about 450° F. No further change in either color or character occurred during the final heating of the solution to an ultimate temperature of 460° F. The product of this reaction was of a two phase nature containing heavy flocks and clear tri octyl phosphate. After cooling to room temperature, and subsequent curing at 250° F. for about seven hours, the product was converted to a single phase liquid of high opacity. Continued heating for some 60 to 70 hours at about 250° F. produced a slight clarification of color of the liquid without any other apparent change. The final product was a thick and viscous liquid of high oiliness characteristics, which has proven suitable for use as a substitute for very thick mineral oils.

Example 4

A dispersion product having a definite gel structure and a viscosity comparable to that of an extremely soft cup grease, has the following formula:

| | Per cent by weight |
|---|---|
| Phenol formaldehyde resin | 7.7 |
| Tri octyl phosphate | 92.3 |

The starting liquid from which this product was prepared, consisted of 6 grams of the 70 per cent resin solution to which reference has been made before, and 50 grams of tri octyl phosphate. This solution, which was of a clear orange color at the start, began to show signs of hazing at a temperature of about 430° F. and became completely opaque at 450° F. but showed no further change in the final heating to an ultimate temperature of 460° F. at which point the product was still very definitely liquid in character. Upon cooling to room temperature a soft gel was formed which upon reheating, did not return to liquid state. Under long continued curing at an average temperature of 250° F. the gel showed no change of consistency, but remained comparable in character to a soft grease. It was noted, however, that the heat curing produced a material improvement in color, the final product being a clear, Burgundy red.

The final dispersion product of this reaction was a very soft and plastic gel which was barely self-sustaining. Like the other dispersions already described, it proved to have excellent lubricating values, and was well adapted for use as a thickened lubricant.

Example 5

A stiff gel which was ultimately reduced to a plastic mass comparable in character to a stiff cup grease has the following formula:

| | Per cent by weight |
|---|---|
| Phenol formaldehyde resin | 13.8 |
| Tri octyl phosphate | 86.2 |

This composition was prepared by the thermal reaction of 10 grams of a solution containing 80 per cent by weight of phenol formaldehyde resin dissolved in ethyl alcohol and acetone, and 50 grams of tri octyl phosphate. This liquid, which was clear at a temperature of about 100° F., showed signs of hazing at a temperature of 410° F. and complete gelation occurred at about 440° F. The resulting highly elastic and rubberylike gel showed no marked change in properties upon long continued heat curing at 250° F., other than an appreciable clarification of its color. This product, as was true of the first of the described example compositions, was entirely too stiff and coherent both at the end of gelation, and after heat curing, to be used as a grease, but was readily reduced to a plastic mass by mechanical working in a colloid mill. The resulting worked product had the consistency of a comparatively heavy cup grease, and proved upon test to have excellent properties as a high temperature lubricant. It has been found, for example, to be particularly useful as a grease substitute in bearings having relatively great clearances, of the kind in which a heavy cup grease would ordinarily be required.

Example 6

It will be noted that all of the previously described dispersion products have included tri octyl phosphate as the liquid phase material. We have found, however, that we can prepare a similar series of dispersion products in which tri-o-cresyl phosphate is employed as the liquid phase ingredient, and which may be varied in consistency in the course of preparation by an adjustment of the resin content between 2 and 20 per cent by weight, with a concomitant variation of the tri-o-cresyl phosphate content between 98 and 80 per cent. A highly useful greaselike lubricant has been prepared, for example, by heating about 10 grams of the 80 per cent phenol formaldehyde solution which has already been described, and some 50 grams of tri-o-cresyl phosphate, to an ultimate temperature of between 440° and 460° F. during which the solution first clouded and then suddenly gelled, all in accordance with the procedure heretofore described in connection with the tri octyl phosphate example compositions. This rubbery gel, upon mechanical working was broken down to a plastic mass having an A. S. T. M. value of about 300, which has proved to be an excellent lubricant for the ball bearings of special high speed electric motors where operating temperatures range up to 400° F. The performance of this gel as a high temperature grease is somewhat better than that of the tri octyl phosphate gel described in Example 1, while its low temperature characteristics are not quite so good. In this latter connection, however, it should be noted that the gel proved to be a satisfactory lubricant at all temperatures down to −20° F., which is of course well below the operating temperatures normally encountered in conventional lubrication service. It is also noteworthy that this gel, apparently because of its high resin content, is particularly resistant to dissolution, having proven insoluble in boiling water, gasoline, naphtha, kerosene, ether benzene, and substantially all of the commercially used aliphatic and aromatic solvents.

Example 7

Other dispersions have been prepared from phenolic resin as heretofore described, and dissolved in acetone, or in acetone and ethyl alcohol, in which tri butyl phosphate and di butyl phthalate have been used respectively as the liquid phase ingredients. In both cases we have prepared a series of dispersions containing from about 2 to about 20 per cent by weight of the resinous matter, with quantities of tri butyl phosphate or di butyl phthalate varying between 98 and 80 per cent by weight of the whole mixture. Here again the dispersions containing up to about 5 per cent of the resinous matter remained liquid at all temperatures, while those having more than 5 per cent of resin took on the nature of gels which varied in consistency between an extremely soft and barely self-supporting mass and a hard and stiff cup grease. All of these products have proven to be excellent lubricants over wide ranges of temperature change and all were adapted to use in solving special lubrication problems.

It will be noted that the several classes of resin base gels which have been described each include a single liquid phase ingredient, namely, tri-o-cresyl phosphate or tri octyl phosphate, or tri butyl phosphate, or di butyl phthalate. We have found, however, that other dispersions may be prepared in which these compounds represent the major liquid phase ingredient to which minor quantities of various addition agents may be added to vary the properties of the finished products. We have found, for example, that we can blend small quantities of hexyl ethyl sebacate, di-2-ethyl hexyl phthalate, tri ethylene glycol di-2-ethyl hexoate, tri ethylene glycol di-2-ethyl butyrate, and others, to form the liquid phase of a large number of dispersion products of both liquid and gel character, all of which have desirable properties for meeting special problems. It may be noted, by way of example, that the addition of any one of these named minor ingredients to the described tri-o-cresyl phosphate example composition produced a gel having somewhat better low temperature characteristics than those of the straight tri-o-cresyl gel, while the vapor pressure of the product is not materially increased so that its high temperature characteristics remain very good. It is also important to note as a general rule, that these and other addition agents must be incorporated in the dispersion products during the course of their preparation, and this is particularly true of the gels which appear to be less compatible with addition agents than do the liquid dispersion products.

We have found that a great number of useful dispersion products may be prepared containing from about 2 to about 20 per cent by weight of resin in the various named liquid phase ingredients. The gels containing the higher concentrations of resin approaching the 20 per cent limit become extremely stiff and hard, and begin to take on a brittle nature, which tends to limit their utility as lubricants. We have further found, however, that additional dispersions may be prepared containing up to about 35-40 per cent of resin depending upon the liquid phase ingredient, and while we know of no specific use to which these high resin bearing products may be put, we call attention to their existence and to the fact that they lie within the purview of our invention.

The dispersion products have been described herein as new compositions of matter, which we believe them to be, and also with particular reference to their utility as lubricants both of the oil and grease type under operating conditions which are far beyond the capabilities of mineral and other oils and of commercial soap greases.

Having described our invention in its preferred aspects and illustrated it by way of specific examples, what we claim as new and useful is:

1. A new composition of matter comprising a dispersion of from about 2 to about 20 per cent by weight of a thermosetting phenol formaldehyde resin in from about 98 to about 80 per cent by weight of a liquid chosen from the group consisting of tri-o-cresyl phosphate, tri octyl phosphate and tri butyl phosphate, the resin having been substantially fully thermoset while dispersed in the said liquid.

2. A new composition of matter comprising a dispersion of from about 2 to about 20 per cent by weight of a thermo-setting phenol formaldehyde resin in from about 98 to about 80 per cent by weight of tri-o-cresyl phosphate, the resin having been substantially fully thermoset while dispersed in the tri-o-cresyl phosphate.

3. A new composition of matter comprising a gel of about 17 per cent by weight of a thermosetting phenol formaldehyde resin in about 83 per cent by weight of tri-o-cresyl phosphate, the resin having been substantially fully thermoset while dispersed in the tri-o-cresyl phosphate.

4. A new composition of matter comprising a dispersion of from about 2 to about 20 per cent by weight of phenol formaldehyde resin in from about 98 to about 80 per cent by weight of tri octyl phosphate, the resin having been substantially fully thermoset while dispersed in the tri-octyl phosphate.

5. A new composition of matter comprising a gel of from about 5 to about 20 per cent by weight of a thermo-setting phenol formaldehyde resin in from about 95 to about 80 per cent by weight of tri-o-cresyl phosphate, the resin having been substantially fully thermoset while dispersed in the tri-o-cresyl phosphate.

6. A new composition of matter comprising a gel of about 11 per cent by weight of phenol formaldehyde resin in about 89 per cent by weight of tri octyl phosphate, the resin having been substantially fully thermoset while dispersed in the tri octyl phosphate.

7. A new composition of matter comprising a gel of about 14 per cent by weight of phenol formaldehyde resin in about 86 per cent by weight of tri octyl phosphate, the resin having been substantially fully thermoset while dispersed in the tri octyl phosphate.

8. A new composition of matter comprising a dispersion of from about 2 to about 20 per cent by weight of phenol formaldehyde resin in from about 98 to about 80 per cent by weight of tri butyl phosphate, the resin having been substantially fully thermoset while dispersed in the tri butyl phosphate.

9. A thickened lubricant in which the major ingredient is a gel prepared by the thermo-setting of from about 2 to about 20 per cent by weight of phenol formaldehyde resin which has not been polymerized substantially beyond the "A" stage, and which contains formaldehyde in excess of a one to one molar ratio of formaldehyde to phenol, in from about 98 to 80 per cent by weight of a liquid chosen from the group consisting of tri-o-cresyl phosphate, tri octyl phosphate, and tri butyl phosphate.

10. The method of preparing a colloidal disperson of a synthetic resin which comprises heating a solution of from 2 to 20 per cent by weight of phenol formaldehyde resin which has not been polymerized substantially beyond the "A" stage and which contains formaldehyde in excess of a one to one molar ratio of formaldehyde to phenol, and from 98 to 80 per cent by weight of a liquid chosen from the group consisting of tri-o-cresyl phosphate, tri octyl phosphate, and tri butyl phosphate, to a temperature and for a time sufficient to produce gelation.

11. The method of preparing a resin base gel which comprises heating a solution of from 5 to 20 per cent by weight of phenol formaldehyde resin which has not been polymerized substantially beyond the "A" stage and which contains formaldehyde in excess of a one to one molar ratio of formaldehyde to phenol and from 95 to 80 per cent by weight of a liquid chosen from the group consisting of tri-o-cresyl phosphate, tri octyl phosphate, and tri butyl phosphate, to a temperature and for a time such as to cause substantially complete thermo-setting of such resin.

12. The method of preparing a resin base gel which comprises heating a solution of from 5 to 20 per cent by weight of phenol formaldehyde resin which has not been polymerized substantially beyond the "A" stage and which contains formaldehyde in excess of a one to one molar ratio of formaldehyde to phenol in a solvent selected from the group consisting of acetone and a mixture of acetone and ethyl alcohol, and from 95 to 80 per cent by weight of a liquid chosen from the group consisting of trio-cresyl phosphate, tri-octyl phosphate, and tri-butyl phosphate, to a temperature of between 430° and 460° F. for a time such as to produce substantially complete polymerization of said resin.

13. The method of making a colloidal dispersion of a thermo-setting plastic which comprises the steps of preparing a solution of phenol formaldehyde resin which has not been polymerized substantially beyond the "A" stage and which contains formaldehyde in excess of a one to one molar ratio of formaldehyde to phenol in a solvent selected from the group consisting of acetone and a mixture of acetone and ethyl alcohol, mixing said solution with a liquid selected from the group consisting of tri-o-cresyl phosphate, tri-octyl phosphate, and tri-butyl phosphate, to give a final solution containing from about 2 to about 20 per cent by weight of resin and from about 98 to about 80 per cent by weight of the selected liquid, and heating such final solution to a temperature and for a time sufficient to cause substantially complete thermo-setting of the resin.

14. The method of preparing a colloidal dispersion having the character of a gel in accordance with claim 13, in which said resin is initially dissolved in a solvent consisting of ethyl alcohol and acetone, and in which the final reaction product contains from about 5 to about 20 per cent by weight of resin and from about 95 to about 80 per cent by weight of the selected fluid.

15. The method of preparing a colloidal dispersion having the character of a gel in accordance with claim 13, in which said resin is initially dissolved in acetone, and in which the final reaction product contains from about 5 to about 20 per cent by weight of resin and from about 95 to about 80 per cent by weight of the selected fluid.

JOHN D. MORGAN.
RUSSELL E. LOWE.

REFERENCES CITED

The following references are of record in the file of this patent:

UNITED STATES PATENTS

| Number | Name | Date |
|---|---|---|
| 1,439,056 | Baekeland | Dec. 19, 1922 |
| 1,592,082 | Conover | July 13, 1926 |
| 2,437,284 | Watson | Mar. 9, 1948 |
| 2,457,087 | Morgan et al. | Dec. 21, 1948 |